(No Model.)  2 Sheets—Sheet 1.

E. H. CALLAWAY.
CAR WHEEL.

No. 303,489.  Patented Aug. 12, 1884.

WITNESSES:
Thomas J. Roberts
Robert M. Bell

INVENTOR
Edward H. Callaway
BY
W. G. Bell
ATTORNEY (No Model.)  E. H. CALLAWAY.  2 Sheets—Sheet 2.
CAR WHEEL.

No. 303,489.  Patented Aug. 12, 1884.

WITNESSES:
Thomas T. Roberts
Robert M. Bell

INVENTOR
Edward H. Callaway
BY
W. P. Bell
ATTORNEY

UNITED STATES PATENT OFFICE.

EDWARD H. CALLAWAY, OF CHICAGO, ILLINOIS.

CAR-WHEEL.

SPECIFICATION forming part of Letters Patent No. 303,489, dated August 12, 1884.

Application filed May 28, 1884. (No model.)

*To all whom it may concern:*

Be it known that I, EDWARD H. CALLAWAY, a citizen of the United States, residing at Chicago, in the county of Cook and State of Illinois, have invented certain new and useful Improvements in Car-Wheels, of which the following is a specification, reference being had therein to the accompanying drawings.

This invention relates to improvements in the construction of that class of railway-wheels having steel tires separate from the cast-iron cores on which they are secured; and it consists in the manner of securing the tires to the wheel-stock and in the conformation of the steel tire and the rim of the stock, all of which will be hereinafter more particularly described, and pointed out in the claim.

Figure 1:
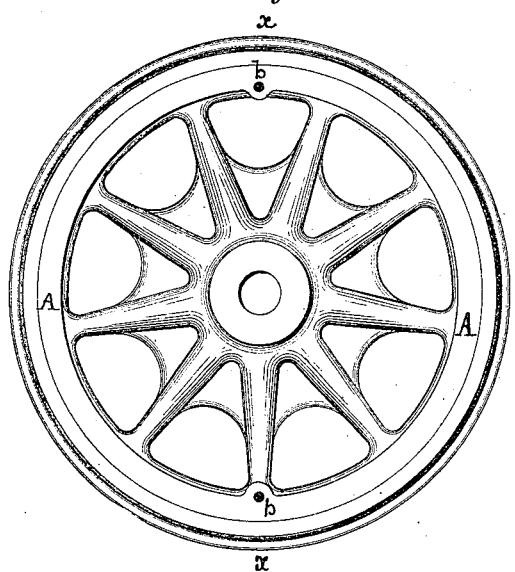
Figure 2:
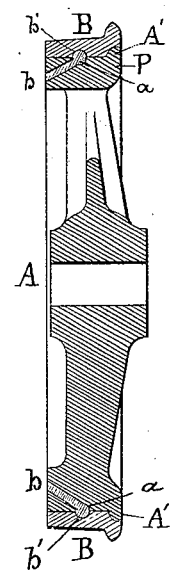

In the accompanying drawings, forming part of this specification, Figure 1 is a side view of a railway-wheel. Fig. 2 is a transverse section on $x\ x$ of Fig. 1. Figs. 3, 4, 5, and 6 are sections of a wheel, showing modifications in the construction.

Figure 4:
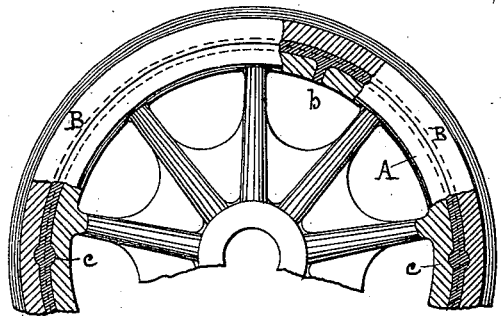
Figure 6:
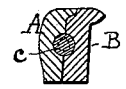
Figure 5:
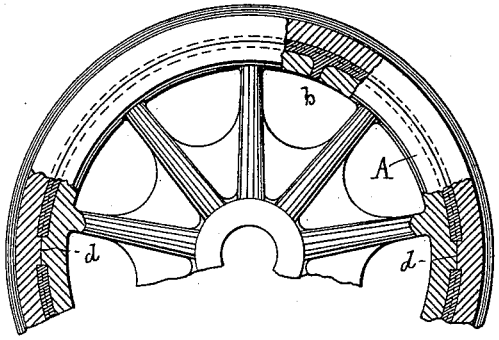
Figure 3:
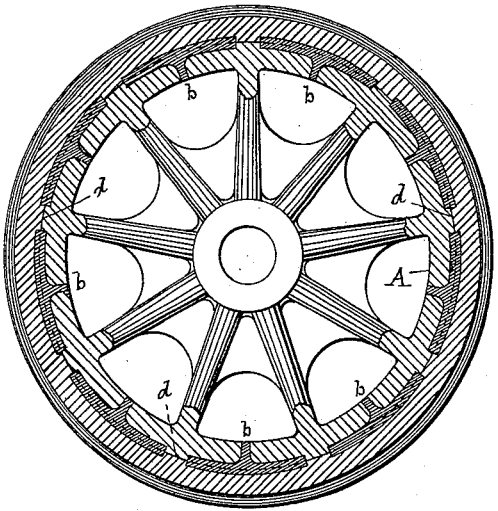

A is a cast-iron spoked wheel, with the flange A', of ordinary construction, and is complete in itself for running upon the rail of a railway-track. In the periphery of the tread the annular groove $a$ is cut or cast in the wheel. At $b\ b$ holes are made from the inner face of the tread at any angle to reach the annular groove $a$, as seen in Figs. 1 and 2; or these holes can be formed, as shown in Figs. 3, 4, and 5, from the inner side of the tread. A steel tire, B, is formed, having its interior surface made exactly conformable to the exterior surface of the cast-iron wheel A, with sufficient "draft" to permit the tire to be forced onto the tread and flange of wheel A and form an accurate fit thereto. Within the steel tire is a groove, $b'$, corresponding exactly with the groove $a$. When the steel tire B is put on and firmly in its place, melted metal is poured into the holes $b\ b$, &c., until the grooves $a\ b'$ are filled, which, when cooled, will form a perfect key between the cast-iron wheel and the steel tire. In the event of the expansion of the steel tire B and its becoming so much larger than the core A that the tire would move over the core, to prevent such movement I have shown in Fig. 4, at $c\ c$, an enlargement of the groove at two or more points, and in Figs. 5 and 7 solid metal in the wheel-stock and in the tire at $d\ d$, which will prevent the above-mentioned difficulty of slipping when the tire may be expanded. By this method of securing a steel tire it can be made much thinner than usual, and as the inner cast-iron wheel is perfectly formed, having its regular flange, should the steel tire become broken it can be at once removed, and the inner wheel will come into use and can be run without the tire for the remainder of the trip.

I am aware that grooves have been made similar to these in railway-wheels, and in which grooves metal rings have been placed, but not melted and poured in; and they were not for the purpose of fastening the parts firmly together, as the several parts were designed to move upon each other; whereas my object is to fill the grooves with melted metal, and to bind the two parts so firmly together that they cannot be moved. The ring forming the key being made round or wedge-shaped, and the flange of the cast-iron wheel being the same shape, in case of expansion in the tire the pressure on the wheels, when running, being outward, will force the wheel farther into the tire, and by means of the flange and ring or key will make the bearing of the tire uniform and prevent it from becoming loose; and when the tire shall contract as it becomes cool it will slip back to its former position.

I claim—

In railway-wheels, the steel tire attached to the rim of the wheel by means of melted metal poured into grooves having a series of enlargements to prevent slipping of the tire on the rim, substantially as and for the purpose described.

In testimony whereof I affix my signature in the presence of two witnesses.

EDWARD H. CALLAWAY.

Witnesses:
F. H. FENNO,
J. H. BROWN.